United States Patent [19]

Stanchina

[11] Patent Number: 5,127,439
[45] Date of Patent: Jul. 7, 1992

[54] SLIDING PLATE VALVE
[75] Inventor: Gregory A. Stanchina, Benicia, Calif.
[73] Assignee: Chevron Research and Technology Company, San Francisco, Calif.
[21] Appl. No.: 726,079
[22] Filed: Jul. 5, 1991
[51] Int. Cl.$^5$ .............................................. F16K 11/02
[52] U.S. Cl. .................... 137/872; 137/554; 137/873; 193/31 R; 251/114; 406/183
[58] Field of Search ............... 137/554, 872, 873; 193/31 R, 31 A; 251/114, 115, 116; 406/182, 183

[56] References Cited
U.S. PATENT DOCUMENTS

| | | | |
|---|---|---|---|
| 913,400 | 2/1909 | Kimball | 251/114 X |
| 2,732,263 | 1/1956 | Riordan | 406/183 |
| 3,510,099 | 5/1970 | Crump | 251/116 |
| 3,805,833 | 4/1974 | Teed | 137/872 |
| 3,907,374 | 9/1975 | Steele | 406/182 |
| 4,381,100 | 4/1983 | Schoenberg | 137/554 X |

Primary Examiner—Gerald A. Michalsky
Attorney, Agent, or Firm—E. A. Schaal; E. J. Keeling

[57] ABSTRACT

A sliding plate is located across a pipe body to form a sliding plate valve having two positions: a through position and a flush position. In the through position, material flows through the pipe body. In the flush position, the flow of material is diverted so it goes out a side opening in the pipe body. An opening in the sliding plate permits material to pass through the plate only when the valve is in the through position, not when the valve is in the flush position. A side cut-out section of the body is attached to the sliding plate so that the section blocks the side opening when the valve is in the through position, but not when the valve is in the flush position.

8 Claims, 2 Drawing Sheets

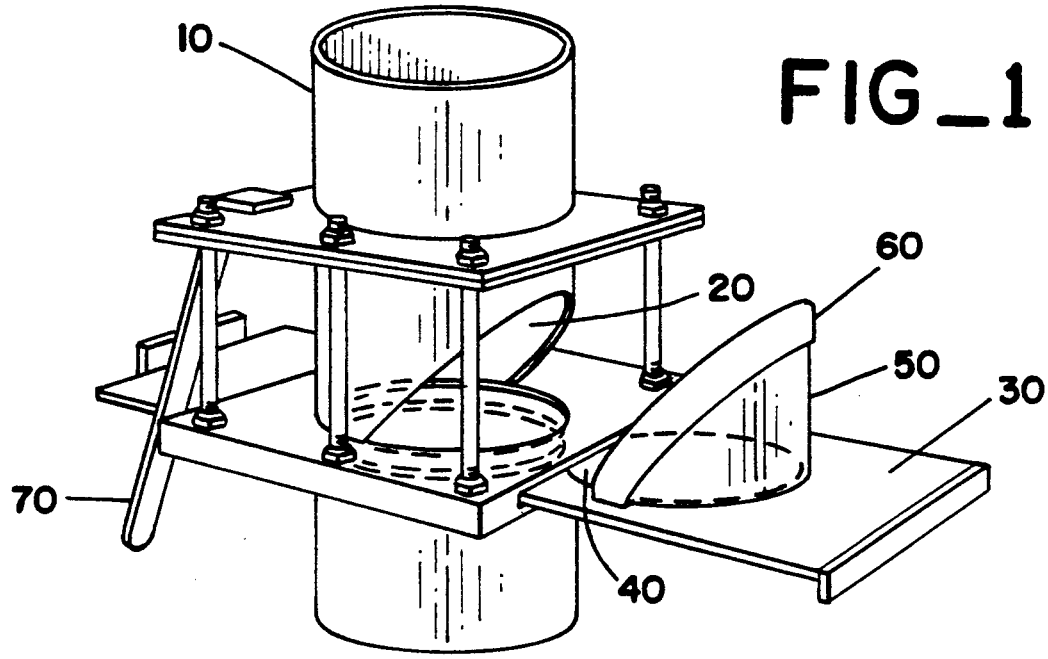
FIG_1
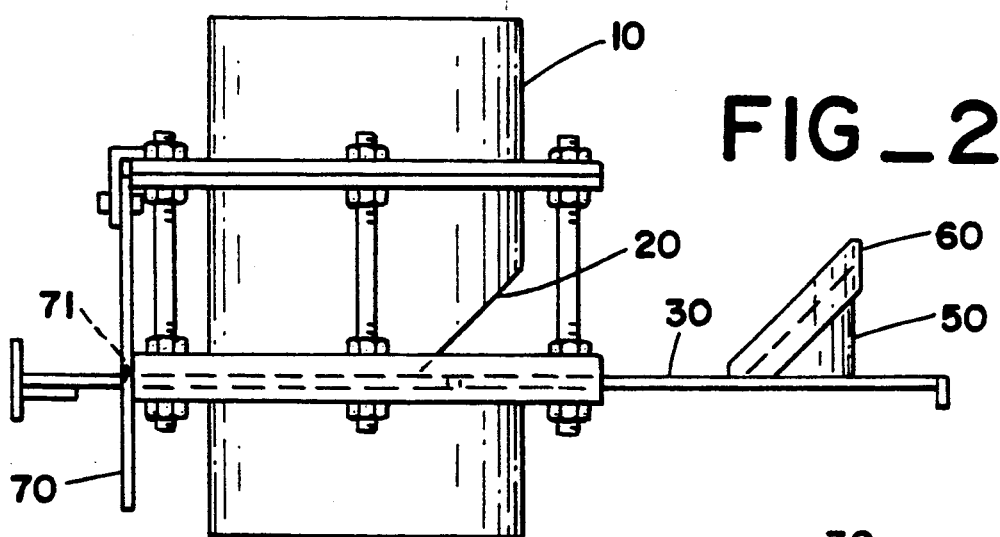
FIG_2
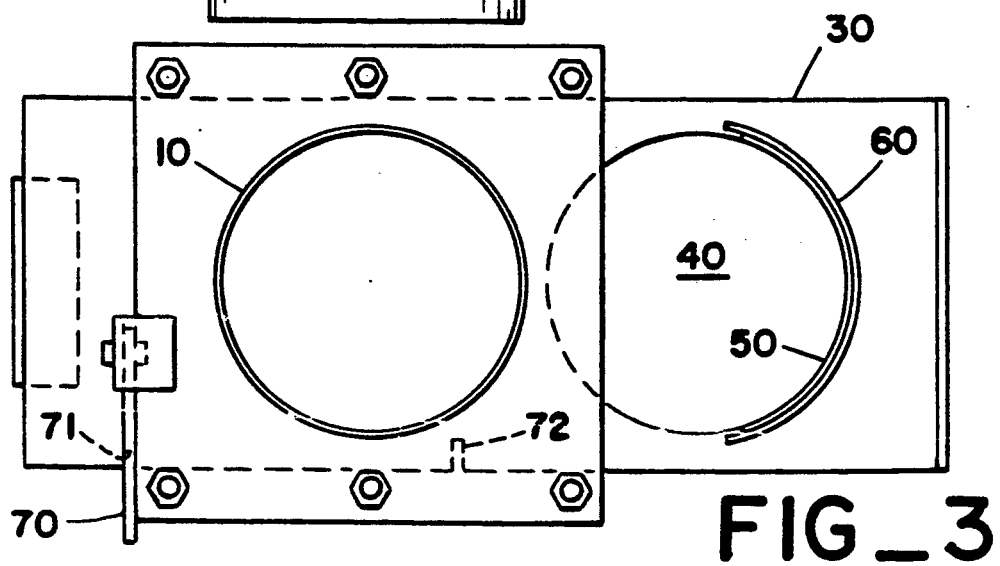
FIG_3

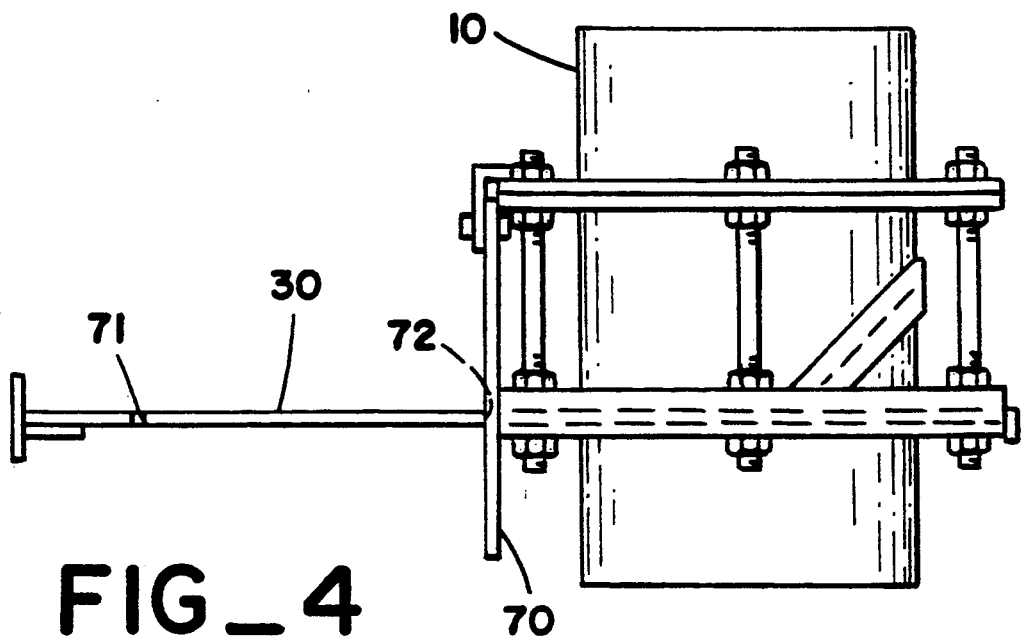
FIG_4
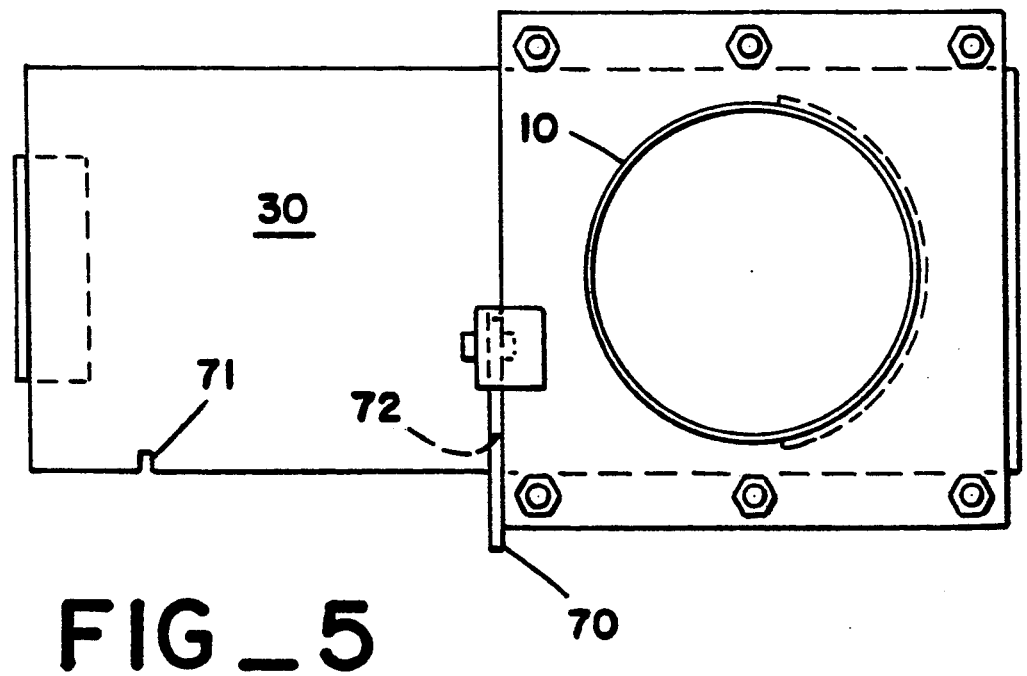
FIG_5

SLIDING PLATE VALVE

The present invention relates to a valve for routing the flow of solids in a material handling system.

BACKGROUND OF THE INVENTION

When handling solids in a material handling system, it is sometimes necessary to divert the flow of solids from their normal flow path, for example, to allow water flushing of polyethylene pellets from a storage vessel.

SUMMARY OF THE INVENTION

The present invention provides a sliding plate located across a pipe body to form a sliding plate valve having two positions: a through position and a flush position. In the through position, material flows through the pipe body. In the flush position, the flow of material is diverted so it goes out a side opening in the pipe body. An opening in the sliding plate permits material to pass through the plate only when the valve is in the through position, not when the valve is in the flush position. A side cut-out section of the body is attached to the sliding plate so that the section blocks the side opening when the valve is in the through position, but not when the valve is in the flush position.

Preferably, the side opening of the body is formed from a cut of the body, such as a straight, angular cut.

Preferably, the side cut-out section has a sealing strip to seal any gap between the cut-out section and the side opening when the valve is in the through position.

Preferably, the valve has a locking means that is capable of locking the valve in the through position. That locking means can consist of an arrangement of a slot in the sliding plate and a lever. When such a locking means is used, the valve should have a sensing means that can sense whether or not the valve is locked in the through position.

The valve can also have a locking means that is capable of locking the valve in the flush position. That locking means can consist of another arrangement of a slot in the sliding plate and a lever. The same lever can be used for both locking means, with the two slots on the same side of the plate. When such a locking means is used, the valve should have a sensing means that can sense whether or not the valve is locked in the flush position.

BRIEF DESCRIPTION OF THE DRAWINGS

In order to assist the understanding of this invention, reference will now be made to the appended drawings. The drawings are exemplary only and should not be construed as limiting the invention.

FIG. 1 shows a perspective elevation of one embodiment of the present invention with the valve in the flush position.

FIG. 2 shows a side elevation of that embodiment of the present invention with the valve in the flush position.

FIG. 3 shows a top elevation of that embodiment of the present invention with the valve in the flush position.

FIG. 4 shows a side elevation of that embodiment of the present invention with the valve in the through position.

FIG. 5 shows a top elevation of that embodiment of the present invention with the valve in the through position.

DETAILED DESCRIPTION OF THE INVENTION

In its broadest aspect, the present invention involves using a valve that has a pipe body with a side opening and a sliding plate having a side cut-out section of the body attached to the sliding plate. The sliding plate moves across the plate so that, when the valve is in the through position, the side opening is blocked by the side cut-out section and material flows through an opening in the sliding plate and through the pipe body. When the valve in the flush position, the pipe body is blocked by the sliding plate and material flows through the side opening.

By "pipe body," we mean a conduit capable of containing flowing material. The pipe body cross-section could have a variety of shapes, materials, wall thicknesses, etc. For instance, the cross-section could be circular, rectangular, etc.

By "through position," we mean the position of the valve in which materials flow through the body instead of out the side opening.

By "flush position," we mean the position of the valve in which materials flow out the side opening instead of through the body.

The pipe body is blocked in the flush position by a sliding plate located across the body. That sliding plate has an opening within the plate such that material can pass through the opening only when the valve is in the through position.

Attached to the sliding plate is a side cut-out section of the body. That cut-out section is located on the sliding plate such that the cut-out section blocks the side opening when the valve is in the through position, but does not block the side opening when the valve is in the flush position.

By "side cut-out section of the body," we mean a section of the pipe that has been cut out of the body and attached to the sliding plate. By "cut out of the body," we mean formed from the original pipe used to make up the valve body. In one embodiment, the side opening of the body is formed from that cut of the body. Preferably, the cut of the body is angular.

Preferably, the side cut-out section has a sealing strip. By "sealing strip," we mean a narrow piece of material attached to the edge of the cut-out section which, when in the through position, covers any gap formed between the valve body and the cut-out section.

Preferably, the valve has a locking means that is capable of locking the valve in the through position. By "locking means," we mean a method of keeping the valve in its desired position while unattended. That locking means can be a lever locking means, such as an arrangement of a lever and a slot on the edge of the sliding plate. That slot is perpendicular to the travel of the plate, so that the lever will prevent the plate from moving out of the through position. When a locking means is used, preferably there should be a sensing means that is capable of sensing whether or not the valve is locked in the through position. By "sensing means," we means a way of electrically detecting and transmitting a signal indicating the position of the valve. Such a sensing means could be a magnetic limit switch and associated wiring.

A similar locking means could be used to lock the valve in the flush position. That locking means can be a lever locking means, such as the arrangement of a lever and a slot within the sliding plate described above. The same lever can be used for both locking means, with the two slots on the same side of the plate. When such a locking means is used, preferably there should be a sensing means that is capable of sensing whether or not the valve is locked in the flush position.

Referring to FIGS. 1 through 5, the sliding plate valve has a pipe body 10 having a side opening 20. A sliding plate 30 is located across the pipe body 10. The sliding plate 30 has an opening 40 located such that material can pass through the opening only when the valve is in the through position. The sliding plate 30 also has a side cut-out section of the body 50 attached to it. That side cut-out section 50 is located on the sliding plate such that it blocks the side opening 20 when the valve is in the through position, but does not block the side opening 20 when the valve is in the flush position. The side cut-out section 50 has a sealing strip 60 to seal any gap between the cut-out section 50 and the side opening 20 when the valve is in the through position. Locking lever 70 is attached to pipe body 10 and fits in slot 71 on sliding plate 30 to lock the valve in the through position or in slot 72 on sliding plate 30 to lock the valve in the flush position.

One use for the valve is in a material handling system for polyethylene pellets. In such a system, when flushing the up-stream system with water, the valve in the flush position diverts the flow of water so it goes out the side opening, preventing water from leaking downstream.

While the present invention has been described with reference to specific embodiments, this application is intended to cover those various changes and substitutions that may be made by those skilled in the art without departing from the spirit and scope of the appended claims.

What is claimed is:

1. A sliding plate valve having a through position and a flush position, the valve comprising:
    (a) a pipe body having a side opening;
    (b) a sliding flat plate located across the pipe body, the sliding plate having an opening located in the plate such that material can pass through the opening in the plate when the valve is in the through position, but material cannot pass through the opening in the plate when the valve is in the flush position; and
    (c) a side cut-out section of the body attached to the sliding plate and located on the sliding plate such that the side cut-out section blocks the side opening when the valve is in the through position, but the side cut-out section does not block the side opening when the valve is in the flush position.

2. A valve according to claim 1 wherein the side opening of the body is formed from a cut of the body.

3. A valve according to claim 2 wherein the cut of the body is angular.

4. A valve according to claim 1 wherein the side cut-out section further comprises a sealing strip.

5. A valve according to claim 1 further comprising a locking means that is capable of locking the valve in the through position.

6. A valve according to claim 5 wherein the locking means is a lever locking means.

7. A valve according to claim 1 further comprising a locking means that is capable of locking the valve in the flush position.

8. A valve according to claim 7 wherein the locking means is a lever locking means.

* * * * *